Patented June 6, 1950

2,510,361

UNITED STATES PATENT OFFICE 2,510,361

METHOD OF PRODUCING SELENIUM RECTIFIERS

Nicolaas Willem Hendrik Addink, Eindhoven, Netherlands, assignor, by mesne assignments, to Hartford National Bank and Trust Company, Hartford, Conn., as trustee No Drawing. Application April 9, 1946, Serial No. 660,858. In the Netherlands April 6, 1944

Section 1, Public Law 690, August 8, 1946
Patent expires April 6, 1964

8 Claims. (Cl. 175—366)

This invention relates to a method of treating the free surface of a selenium electrode with a liquid with a view to forming a blocking layer, more particularly by immersion and drawing up.

For the formation of a blocking layer on the free surface of a selenium electrode it has already been proposed to immerse a carrier plate and the selenium layer on it in a solution of polystyrene in benzene and to lift it slowly out of this solution. The concentration of the solution and the speed of lifting were responsible for the thickness of the blocking layer consisting of polystyrene, after expelling the benzene by vaporization. The latter took place at a temperature only slightly exceeding room temperature, the benzene having an appreciable vapour pressure even at room temperature. Such a blocking layer has on the one hand excellent blocking properties, so that a high counter voltage may be used in a rectifier comprising such a blocking layer, but on the other hand the forward current is not always quite satisfactory.

Furthermore, it is known to immerse a carrier furnished with a selenium layer in a solution of sodium sulphide in alcohol. These substances slightly dissolve the selenium, thus initiating the formation of a blocking layer. At the same time the surface of the selenium is converted into the grey crystalline modification.

In addition it has been proposed to heat selenium plates at about 200° C. for several hours in the vapour of a definite substance. The organic substance, for instance an isocyclic amine or a heterocyclic compound e. g. pyridine would partly decompose and form a deposit of condensated, dark brown conversion products on the selenium layer. The production of such a layer, which would play a part in regard to the blocking effect in the finished rectifier takes a very long time, viz. several hours as stated above.

The present invention is based on the recognition that a double effect is desired in forming the blocking layer i. e. the selenium at the surface should be dissolved in a manner known per se and on the other hand a homogeneous layer of a material having good insulating properties should be left on the surface.

This is best attained by taking care that the treated material separately contains the materials by means of which these two effects are obtained.

The invention is characterized in that use is made of a liquid which contains an organic substance dissolving selenium, in combination with an insulating material which is left in a continuous layer on the selenium after vaporisation of the solvent.

By the use of a liquid dissolving selenium it is ensured that the selenium surface is thoroughly moistened by the liquid. Consequently, the adherence of the liquid to the selenium surface is so intimate that the layer that is left on the selenium surface after leaving the liquid is evenly distributed throughout, thus forming a very homogeneous layer.

Consequently a very homogeneous insulating layer is obtained after vaporisation of the solvent.

The presence of insulating material in a continuous layer on the selenium surface largely increases the back voltage on a blocking layer cell. The blocking effect of a cell is mainly due to the presence of such a layer. Thus, the selenium is evenly dissolved at the surface and in addition a uniform layer of insulating material ensues.

It is the homogeneity which is of very great importance, since it permits the manufacture of plates having a very large surface whose electrical properties are substantially uniform throughout the surface. This will be more fully explained hereinafter.

In a suitable example of the invention an organic substance having a resinous constituent is used to constitute the liquid used for the treatment. Consequently, one and the same liquid may be used for the treatment, which liquid has the aforesaid double effect on the selenium surface.

In general, it appears that the organic substances dissolving the selenium are excellent resin formers i. e. that these substances can be decomposed to resins i. e. materials which may be used for the production of a blocking layer at the selenium surface.

This may be utilized by forming the resinous constituent by a preceding preparation of such an organic liquid. In this case the liquid used for the treatment consists of a solvent for the resin formed therein which solvent itself dissolves selenium.

For the resinification we preferably proceed in such a manner that the liquid to be treated is subjected to a thermal treatment in the air.

It is advantageous to keep the solvent during the treatment at a temperature in the proximity of its boiling point. This yields the advantage that the solvent evaporates swiftly and evenly after a treated plate has been immersed and drawn out of the liquid. Materials such as piperidine, pyridine, quinoline, triethanolamine and similar compounds enter into account. For resinification they should previously be subjected to a thermal treatment.

One executional example of the method according to the invention is given below.

In a manner known per se a certain quantity of selenium is provided by centrifugation on a roughened aluminium carrier plate furnished with a layer of carbon. To the selenium may previously be added an admixture for increasing its conductivity. To make the selenium more compact and to obtain a perfectly smooth surface the carrier with the layer of selenium is covered with a mica disc, introduced into a press and pressed at a temperature of about 150–200° C. After that the plate is immersed for about 1 minute in a bath which is kept at 180° C. and consists of quinoline followed by lifting it out of the bath.

Consequently this temperature substantially corresponds on the one hand to the boiling point of quinoline, and on the other hand the temperature at which the selenium surface is treated is below the melting temperature of selenium. The quinoline is previously prepared by a thermal treatment in the air at 200° C. for half an hour. A quantity of resin is formed which is available in the dissolved state in a concentration of about 0.1%. Upon lifting out, the quinoline evaporates immediately and an extremely thin, but homogeneous layer of resin is left. Special precautions to remove any residues of the solvent are superfluous, so that the treatment is extremely simple. The selenium, which has been partly converted into the conducting crystalline modification during the aforesaid pressing operation, is subjected again to a thermal treatment at about 200° C. for 15 minutes to complete the conversion, followed by spraying on it the counter-electrode which consists of an alloy of tin, bismuth and cadmium.

When substituting other materials for the quinoline use may be made of a separate solvent. For pyridine, for instance, kerosene may be used. Consequently, a solvent is used by means of which the treatment of the selenium surface may take place again at a temperature closely approaching the boiling point of the solvent, but remaining below the melting temperature of selenium. The adjustment of the boiling point may also take place by performing the treatment in a closed spaced in which a suitable pressure is produced.

To convey some idea of the homogeneity of the blocking layer plates having a small surface, for instance, 7 mm², are punched out of the plate thus manufactured, which may have a surface of 16 cm². Of these plates the forward current and the reverse current are measured. It is found, that the ratio of the maximum and minimum forward current measured with such a series of plates is about 2½. The ratio between the maximum and the minimum reverse current occurring appears to be about 2.

Since the breakdown voltage of a rectifier plate depends on those parts of the plate having the worst properties and a rectifier plate made by means of the method according to the invention is very homogeneous, this plate permits the obtainment of a favourable breakdown voltage. In this case the forward current has a very suitable value.

What I claim is:

1. A method of manufacturing a blocking layer rectifier, comprising the steps of forming a selenium electrode on a base, heating a selenium dissolving organic liquid in air to the boiling point of said liquid to form a resinous material in solution, applying said treated organic liquid to the selenium electrode, evaporating said liquid to form a blocking layer on said electrode, and applying a counter-electrode on said blocking layer.

2. A method of manufacturing a blocking layer rectifier, comprising the steps of forming a selenium electrode on a base, heating a selenium dissolving organic liquid in air to the boiling point of said liquid to form a resinous material in solution, applying said treated organic liquid to the selenium electrode while maintaining the temperature of said liquid near its boiling point but below the melting point of selenium, evaporating said liquid to form a blocking layer on said selenium electrode, and applying a counter-electrode on said blocking layer.

3. A method of manufacturing a blocking layer rectifier comprising the steps of forming a selenium electrode on a base, heating a selenium dissolving organic liquid in air to the boiling point of said liquid to form a resinous material in solution, applying said treated organic liquid to the selenium electrode while maintaining the temperature of said liquid at a temperature of approximately 180° C., evaporating said liquid to form a blocking layer on said selenium electrode, and applying a counter-electrode on said blocking layer.

4. A method of manufacturing a blocking layer rectifier, comprising the steps of forming a selenium electrode on a base, heating quinoline to about 200° C. in air for approximately one half hour, immersing said selenium electrode in the quinoline for about one minute while maintaining the quinoline at approximately 180° C., removing the electrode from the quinoline, evaporating the liquid on said electrode to form a blocking layer thereon, and applying a counter-electrode to said blocking layer.

5. A method of manufacturing a blocking layer rectifier, comprising the steps of forming a selenium electrode on a base, dissolving pyridine in kerosene, heating the solution of pyridine in kerosene in air to the boiling point of said solution, immersing the selenium electrode in the solution while maintaining the temperature of the solution near its boiling point and below the melting point of selenium, removing the selenium electrode from solution, evaporating the liquid from the selenium electrode to form a blocking layer thereon, and applying a counter-electrode to said blocking layer.

6. A blocking layer rectifier comprising a selenium electrode, a blocking layer on said selenium electrode comprising a genetic portion of quinoline treated selenium and a non-genetic portion of resinous material, and a counter-electrode on said blocking layer.

7. A blocking layer rectifier comprising a selenium electrode, a blocking layer on said selenium electrode comprising a genetic portion of quinoline treated selenium and a non-genetic portion of a resinous quinoline residue, and a counter-electrode on said blocking layer.

8. A method of manufacturing a blocking layer rectifier comprising the steps of forming a selenium electrode on a base, subjecting the selenium electrode to the action of an organic selenium dissolving liquid containing an insulating material therein, evaporating the liquid to form a blocking layer on the said electrode, and applying a counter-electrode on said blocking layer.

NICOLAAS WILLEM HENDRIK ADDINK.

REFERENCES CITED

The following references are of record in the file of this patent:

UNITED STATES PATENTS

| Number | Name | Date |
| --- | --- | --- |
| 2,121,603 | Lotz | June 21, 1938 |
| 2,131,167 | De Boer | Sept. 27, 1938 |
| 2,139,731 | De Boer | Dec. 13, 1938 |
| 2,162,613 | Emmens et al. | June 13, 1939 |
| 2,193,598 | Lotz | Mar. 12, 1940 |
| 2,328,440 | Esseling et al. | Aug. 31, 1943 |

OTHER REFERENCES

Clark et al., "American Electro Chemical Society," vol. 79, page 355, April 21, 1941.